July 26, 1955 — O. FROIDEVAUX — 2,714,021
PRESSURE-LUBRICATING DEVICES
Filed March 19, 1951

Oscar Froidevaux
Inventor.

By Henderson, Lind + Ponack
Attorneys.

United States Patent Office 2,714,021
Patented July 26, 1955

2,714,021

PRESSURE-LUBRICATING DEVICES

Oscar Froidevaux, Antony, France, assignor to Société so-called: Tecalemit, Société Anonyme, Paris, France Application March 19, 1951, Serial No. 216,302

Claims priority, application France March 21, 1950

3 Claims. (Cl. 285—168)

One embodiment of pressure lubricating device is known which comprises an adaptor having slidably mounted in it a piston consisting of a flat resilient washer formed with a central hole for allowing the lubricating medium to pass therethrough; this washer bears with its peripheral edge against the clamping means and with its central portion against the upper flat side of the head of a sphero-frustoconical nipple or fitting; oil-tightness inside the adaptor and on the fitting head is assured by the aforesaid resilient washer.

When the adaptor is applied upon and in axial alignment with a fitting, the resilient packing washer can withstand a relatively long use although it is submitted to any mechanical and hydraulic pressures; however, when the connection between adaptor and fitting is accomplished in different angular relationships the washer will be deteriorated after a certain use by the circular edge resulting from the intersection of the frustoconical portion with the upper flat surface of the head of the fitting. This deterioration is further aggravated by the fact that for disconnecting the adaptor from the fitting after use it is necessary to considerably incline the former in relation to the axis of the latter.

The hitherto known connectors in which a material that can go out of shape resiliently is used for ensuring the required oil-tightness have not been entirely satisfactory and this is imputable to several reasons.

One reason is that a single element only is provided for preventing grease or oil leaks both inside the adaptor and on the fitting head, which makes it impossible to select the most suitable material for eliminating leakages inside the adaptor, on the one hand, and on the fitting head, on the other hand.

Another reason is that the yielding material, subjected to the high injection pressure of the lubricant and to the the various connecting and disconecting operations, on viding the initial connection, on the one side, and from the various connectings and disconnecting operations, on the other side, will spread in the gaps and interstices between metal parts, and the more yielding the material, the more it will spread under the combined influences set forth above.

This explains why a metal-metal contact alone has hitherto been the most lasting and efficient means of eliminating leakages in hydraulic clamps to be coupled to the heads of sphero-frustoconical fittings for the high-pressure distribution of lubricants.

It is also known that the slightest deterioration on the fitting head, as may result for instance from the impact of a body on the sealing edge, is sufficient to create a leak.

One object of this invention is to provide a novel device adapted to effect a sealing connection having a high and lasting resistance to wear and tear and whereby the required tightness is maintained even in case the fitting head has undergone certain permanent changes in shape.

This novel lubricating device is characterized in particular by the fact that the elimination of leakages on the fitting head is accomplished by means of a tubular gasket of resilient yielding material which is preserved from any mechanical stresses, the elastic deformations of this gasket resulting only from the radial pressure exerted by the lubricant inside the centre hole of the tubular gasket, the sealing of the inner portion of the adaptor being obtained by means of a piston having a resilient ring member held by a metal washer and supporting all the mechanical and hydraulic stresses transmitted to the head of the fitting through a metal sleeve member and a rigid cup member formed with a seat to match the head of the lubricating fitting.

Amongst other characteristic features of the device:

(a) The piston may consist of a ring of resilient yielding material maintained by a metal washer guided in the bore of the adaptor and formed with a central hole for allowing the lubricating medium to pass therethrough;

(b) The gasket providing an oil-tight sealing with the head of the fitting is disposed inside a sleeve member mounted with a slight clearance inside the adaptor;

(c) The sleeve member surrounding the sealing gasket on the head of the fitting is adapted to act as a distance-piece between the piston metal washer and the rigid cup member and therefore acts as a ferrule to the sealing gasket;

(d) The diameter of the rigid cup member is smaller than its receiving chamber and the cup member is formed with a central tapered hole forming a wider angle than the frustoconical head portion of the fitting to which this cup member transmits any mechanical and hydraulic stresses, thus permitting this cup member to become normally misaligned in relation to the adaptor axis when the connection between adaptor and fitting is made with a given angular relationship;

(e) The clamping jaws provided for retaining the device on the head of the fitting are formed with torus-shaped swellings adapted to engage the lower spherical portion of the fitting along a circular line positioned beneath this head; these jaws, during their normal displacements toward and away from the axis of the adaptor and in sliding engagement with the tapered surface of the lower portion of the fitting, are guided by the lower face of the cup member.

Other advantages and features of the invention will appear from the following description if reference is made to the affixed drawing forming part of this specification and illustrating diagrammatically by way of example one embodiment of the invention. In the drawing.

Figure 1:
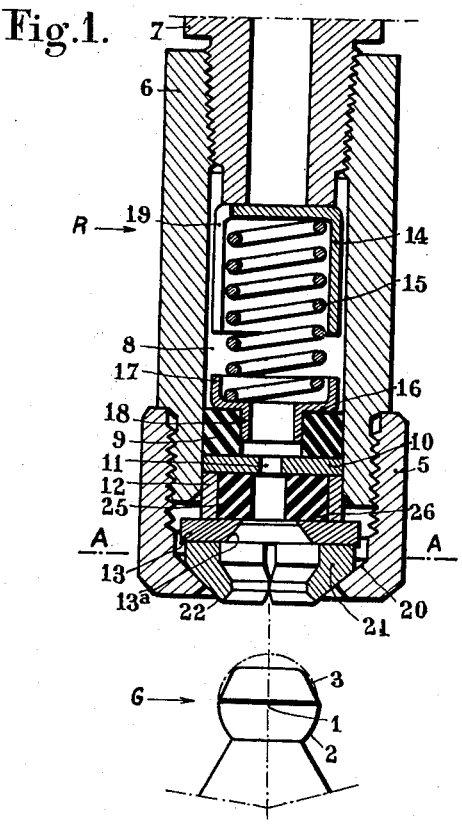
Fig. 1 is a vertical section of the adaptor and an elevational view of the lubricating fitting or nipple, before these parts are connected for transferring lubricant from the former to the latter.

Referring now to the drawing, the fixed fitting and movable adaptor or nozzle forming the two parts of the connection according to the novel lubricating device according to the invention are designated by letters G and R, respectively.

Figure 2:
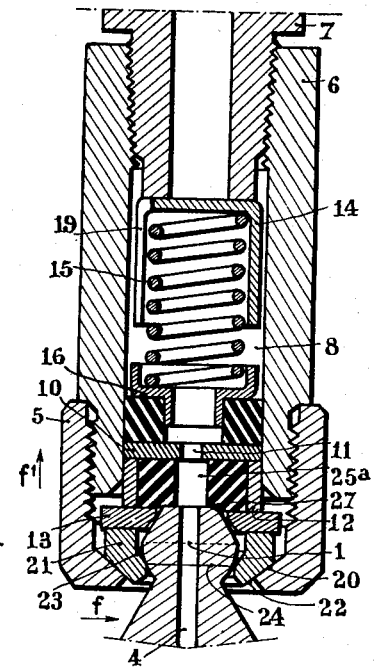
Fig. 2 is a view similar to Fig. 1 but showing both parts coupled in axial alignment.

The fitting G which, in the conventional fashion, is formed with a head inscribed in a sphere having a centre 1, a lower spherical portion 2 and an upper frusto-conical portion 3, has a central passage 4 (Fig. 2) through which the lubricating medium is transmitted from the adaptor R to the part to be lubricated and on which the fitting is fixed in any known or suitable manner.

The adaptor or nozzle R consists of two tubular members, i. e. a lower member 5 called "coupling socket" and an upper member 6 called "connecting union."

The connecting union 6 is formed at its upper end with an internally screw-threaded portion adapted to engage a corresponding screw-threaded portion 7 of the dispensing tube of a lubrication battery or grease-gun (not shown) or any other suitable pressure-lubrication device, and, at its lower end, with a male screw-threaded portion on which the cooperating coupling socket 5 may be screwed on assembling the device.

The connecting union 6 is formed with a bore 8 in which a piston consisting of a resilient ring 9 supported by a metal washer 10 is slidably mounted. The washer 10 is formed with a central hole 11 for allowing the lubricant to pass therethrough.

The metal washer 10 rests with its lower face upon the upper side of a metal sleeve 12 acting as a distance-piece between the washer 10 and a cup member 13 formed with a lower concave seat 13a the shape and scope of which will be explained presently.

Inside the aforementioned bore 8 of the connecting union 6 an inlet valve 14 is mounted with a loose fit clearance. This valve, when the device is inoperative, is urged by a spring 15 against the outlet orifice of the dispensing tube end 7. On the other hand, this spring urges the piston assembly 9, 10 downwards by exerting its elastic pressure upon the resilient ring 9 through the medium of a circular member 16 formed with an upper cup-shaped portion 17 adapted to receive the aforesaid spring and a lower cylindrical portion 18 engaging the hole of the resilient ring 9 and acting as an inner ferrule thereto.

The cap-shaped inlet valve 14 is formed with one or more longitudinal slots or apertures 19 to facilitate the ingress of lubricant in the bore 8.

The lower portion of the coupling socket 5 has an inner tapered surface 20 slidably engaged by corresponding surfaces 22 of clamping jaws or retaining members 21.

These retaining members 21 are also formed with torus-shaped swellings 23 adapted to engage the head of the fitting along a circular line 24 situated above the centre 1 of the sphere in which the sphero-frustoconical head of the fitting or nipple G is inscribed.

The tubular gasket 25 provided in view of sealing the connection with the fitting G consists of a socket of resilient yielding material which is a tight fit in the metal sleeve 12 and of a height equal to or slightly above the distance between the upper face 26 of cup member 13 and lower face of metal washer 10.

When the piston assembly 9, 10 is subjected to the pressure of spring 15 caused by the introduction of the head of the fitting into the adaptor, the washer 10 is urged against the upper face of sleeve 12 and the pressure is thus transmitted through the latter to the cup member 13 which, with its seat 13a, is pressed against the frusto-conical surface 3 of the head of the fitting to be fed with lubricant, this latter engagement taking place above the centre 1 of the head. Under these conditions of preliminary coupling and due to the action exerted by spring 15 alone, the tubular gasket 25 is slightly urged to expand inside a rigid chamber defined by the head of the fitting, upper face of cup member 13, inner wall of sleeve member 12 and lower face of metal washer 10 of the piston assembly 9, 10. The tension thus set up in the resilient material of the tubular gasket is caused by the pressure exerted by the head of the fitting against the inner circular edge 27 of the gasket and, possibly, by an axial compression resulting from a very slight difference between the height of the gasket and the distance from the upper face of cup member 13 and the lower face of washer 10.

When the device is fed with lubricant under pressure, the inlet valve 14 thereof is moved downwards against the spring 15, thus allowing the lubricant to flow into the device and to directly hit the piston assembly 9, 10 the metal washer 10 of which transmits the axial thrust to sleeve member 12 and, through the intermediary of the latter, to cup member 13 abutting on the frusto-conical portion 3 of the head of fitting G.

The lower face of cup member 13 acts as a fixed abutment on which the clamping jaws 21 are so guided as to draw nearer and nearer to each other according to the pressure of the lubricant when they are urged to move in the radial direction resulting from the horizontal component (see arrow $f$) of the vertical thrust (see arrow $f^1$) exerted by the tapered surface 20 of the coupling socket 5 against the cooperating surfaces 22 of jaws 21, whenever the pressure reaches a value such as to urge the movable portion of the adaptor away from the fixed fitting.

It will be noted that the tubular gasket 25 is preserved from both the pressure of spring 15 and the direct axial pressure of the lubricant. The only changes in shape it undergoes on account of the increment of pressure are caused by the radial forces acting in its hole 25a which are sufficient to provide the required tightness both on the head of the fitting and inside the unchanging receptacle of this gasket.

Figure 4:
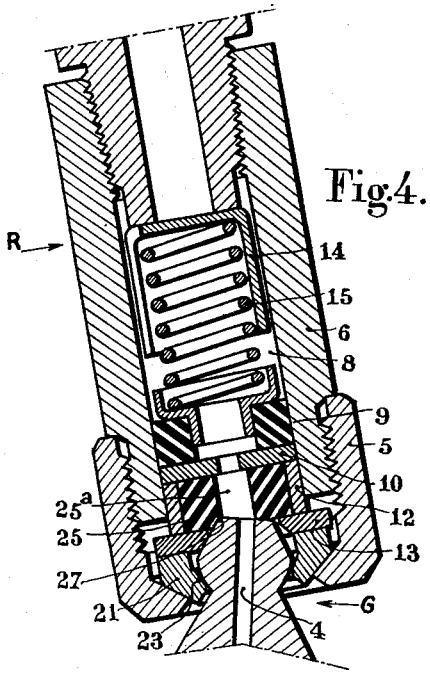
Fig. 4 is a view similar to Fig. 2 but showing the adaptor coupled to the fitting according to a given angular relationship.
Figure 3:
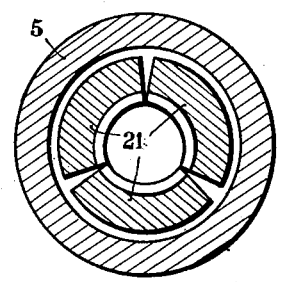
Fig. 3 is a horizontal section along the line A—A of Fig. 1.

An essential feature of the invention lies in the fact that the rigid cup member 13 has a smaller diameter than the bore 8 of connecting union 6, and that its axial aperture 13a, which acts as a concave seat, is a tapered hole forming a wider angle than that of the frusto-conical portion of the head of fitting G. Thus, when the adaptor and fitting are so connected that their axes are in angular instead of co-axial relationship, the cup member 13 may move in a plane at right angles to the axis of the adaptor R and thus maintain without any jamming the abutting contact with the frustoconical portion of the head of the fitting and also without allowing any clearances or interstices to be formed in which the resilient material of the tubular gasket 25 could spread. During its movements at right angles to the axis of the adaptor R the cup member 13 is guided between the parallel registering faces of sleeve member 12 and clamping jaws 21 (see Fig. 4).

Whilst the above description and affixed drawing refer to a specific embodiment of the invention given for illustrative purpose only, it will be readily understood by anybody conversant with the art that various modifications may be brought to the shapes and relative dimensions of the device without departing from the spirit and scope of the invention as defined in the accompanying claims.

What I claim is:

1. A coupler for connecting a source of lubricant under pressure with a fitting of the type comprising a head having a frustoconical upper half and a spherical lower half, said coupler comprising a coupling socket having a predetermined inner diameter, formed with a constricted front aperture and an internally-threaded rear aperture, gripping jaws located in said socket formed with front end portions engaging the edge of said constricted front aperture of said socket, said jaws being disposed ringwise and having a flat rear surface, a cup member of a diameter substantially smaller than the inner diameter of said coupling socket, having a flat front surface engaging said flat rear surface of said gripping jaws projecting with its outer periphery radially from said flat rear surface of said jaws, being adapted to slide radially in relation to and within said coupling socket, and having a flat rear surface and a central hole of circular contour therein, the profile of said hole being adapted to fit in fluid-tight relationship on said frustoconical upper half of said fitting head, a substantially cylindrical adaptor having a smaller inner diameter than said cup member, said adaptor having its front end screwed in said internally-threaded rear aperture of said coupling socket and its rear end adapted to be connected with the source of lubricant under pressure, a sleeve mounted for longitudinal sliding movement in said coupling socket, formed with a flat front end engaging said flat rear surface of said cup member and permitting the radial sliding movements thereof in said coupling socket, a resilient tubular gasket engaging through its outer cylindrical wall the inner wall of said sleeve, the front end surface of said gasket engaging with its outer marginal portion the inner marginal portion of the rear surface of said cup member and with its inner marginal portion the fitting head, and means mounted in said adaptor, behind said sleeve and said resilient tubular gasket to provide a seal between said adaptor, said sleeve and said resilient tubular gasket during the periods in which compressed lubricant is admitted through the coupler, and to urge said sleeve and said resilient tubular gasket forwards, against said cup member and gripping jaws, outside said periods.

2. A coupler for connecting a source of lubricant under pressure with a fitting of the type comprising a hemispherical rear portion and a flat circular end having a certain diameter merging at its rear portion with a frustoconical surface having a predetermined angle, said coupler comprising a coupling socket having a given inner diameter, formed with a constricted front aperture and an internally-threaded rear aperture, gripping jaws located in said socket, formed with front end portions engaging the edge of said constricted front aperture of said socket, disposed ringwise and having a flat rear surface, a cup member of a diameter substantially smaller than the inner diameter of said coupling socket, having a flat front surface engaging said flat rear surface of said gripping jaws, projecting with its outer periphery radially from said flat rear surface of said jaws, being adapted to slide radially in relation to, and within, said coupling socket, and having a flat rear surface and a central hole extending through said rear face so as to form a circle slightly greater than that constituted by the outer edge of the fitting head and being widened towards its front surface so as to form a frusto-conical aperture of an angle slightly greater than that of said frusto-conical surface of said fitting head, a substantially cylindrical adaptor having an inner diameter smaller than said cup member diameter, said adaptor having its front end screwed in said internally-threaded rear aperture of said coupling socket and its rear end adapted to be connected with the source of lubricant under pressure, a sleeve mounted for longitudinal sliding movement in said coupling socket, formed with a flat front end engaging said flat rear surface of said cup member and permitting the radial sliding movements thereof in said coupling socket, a resilient tubular gasket engaging through its outer cylindrical wall the inner wall of said sleeve, the front end surface of said gasket engaging with its outer marginal portion the inner marginal portion of the rear surface of said cup member and with its inner marginal portion the fitting head, and means mounted in said adaptor, behind said sleeve and said resilient tubular gasket, to provide a seal between said adaptor, said sleeve and said resilient tubular gasket during the periods in which compressed lubricant is allowed through the coupler, and to urge said sleeve and said resilient tubular gasket forwards, against said cup member and gripping jaws, outside said periods.

3. A swivelling coupler for filling a nipple having a sphero-frusto-conical head with grease under relatively high pressure, comprising a nozzle, a piston within said nozzle responsive to the lubricant pressure, clamping jaws for cooperating with the spherical lower portion of said nipple head actuated by said piston, an axially slidable rigid sleeve member between said piston and said clamping jaws, a resilient annular inner gasket located within said sleeve member, a rigid washer cooperating with said sleeve member and gasket having its outer periphery spaced from the inner wall of said nozzle so as to be radially displaceable therein and said washer having a central tapered hole having a greater conicity than the upper frusto-conical portion of said nipple head.

References Cited in the file of this patent
UNITED STATES PATENTS

| | | |
|---|---|---|
| 2,061,086 | Nord | Nov. 17, 1936 |
| 2,362,880 | Campbell | Nov. 14, 1944 |

FOREIGN PATENTS

| | | |
|---|---|---|
| 986,477 | France | Mar. 28, 1951 |